United States Patent [19]
Tanaka

[11] 3,885,289
[45] May 27, 1975

[54] APPARATUS FOR INSTALLING BATTERY VENT PLUG

[75] Inventor: Teruaki Tanaka, Takatsuki, Japan

[73] Assignee: Yuasa Battery Company Limited, Takatsuki, Japan

[22] Filed: May 15, 1974

[21] Appl. No.: 470,315

[30] Foreign Application Priority Data
Nov. 20, 1973  Japan.............................. 48-130904

[52] U.S. Cl................................ 29/204 R; 29/240
[51] Int. Cl...................... H01m 35/18; B23p 19/04
[58] Field of Search.......... 29/204 R, 204 D, 211 R, 29/240

[56] References Cited
UNITED STATES PATENTS
1,729,843  10/1929  Reich.................................... 29/204
2,974,406  3/1961  Vilmerding........................... 29/240

Primary Examiner—Thomas H. Eager
Attorney, Agent, or Firm—Watson, Cole, Grindle & Watson

[57] ABSTRACT

This invention relates to an apparatus for installing battery vent plug comprising a battery fixing means for fixing a battery, a vent plus holding means for holding a vent plug supplied from a vent plug supplying means, a vent plug catching means for catching the vent plug and bringing it to a vent of the battery, a vent plug screwing means for fitting the vent plug to the vent of the battery and a battery conveying means for conveying the battery fitted with the vent plug, said respective means being operatively connected with one another. This invention has an advantage that many vent plugs can be fitted to many batteries quickly at a high efficiency without requiring manual works so that the reduction of the cost of the product may be expected.

4 Claims, 3 Drawing Figures

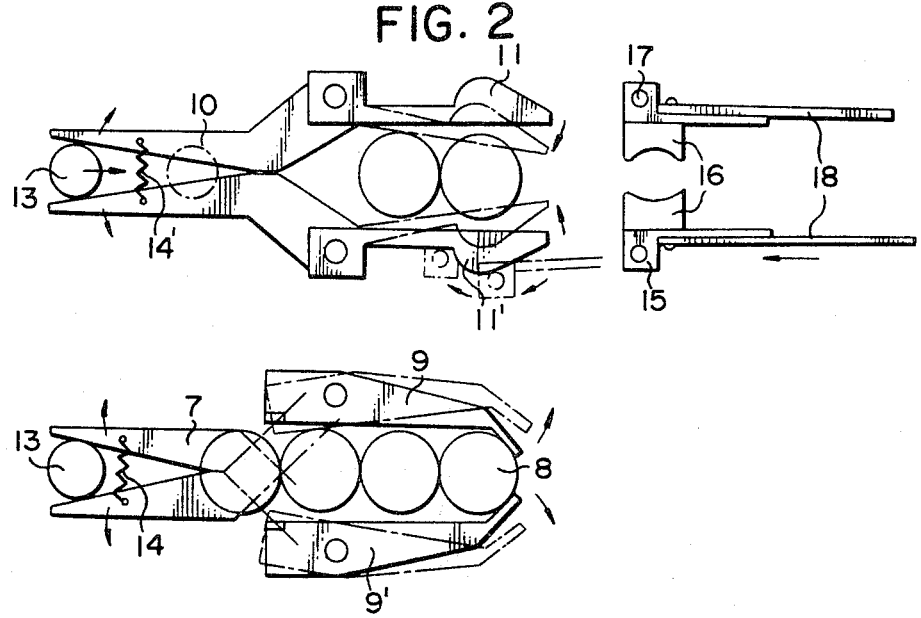

APPARATUS FOR INSTALLING BATTERY VENT PLUG

This invention relates to battery apparatus and more particularly to an improved apparatus for installing battery vent plugs.

A plurality of vent plugs are fitted to a conventional battery. In installing many vent plugs to many batteries, there are defects that a long time and complicated manual works are required and that the cost of the product is high. This invention is to overcome all of such defects.

A first object of this invention is to provide a novel apparatus for installing battery vent plug for automatically and quickly installing many vent plugs to batteries.

A second object of this invention is to provide a novel apparatus for installing battery vent plug wherein respective component means are operatively connected and mechanically integrally combined with one another.

A third object of this invention is to provide an apparatus for installing battery vent plug which is so high in the efficiency that the cost of the product can be expected to reduce.

These objects of this invention will be able to be easily understood from the following description with reference to the accompanying drawings in which:

FIG. 2 is an explanatory view of essential parts of FIG. 1;

FIG. 3 is a chart explaining a time lapse in which the main elements of the respective means forming the apparatus of this invention operate as related with one another.

Figure 1:
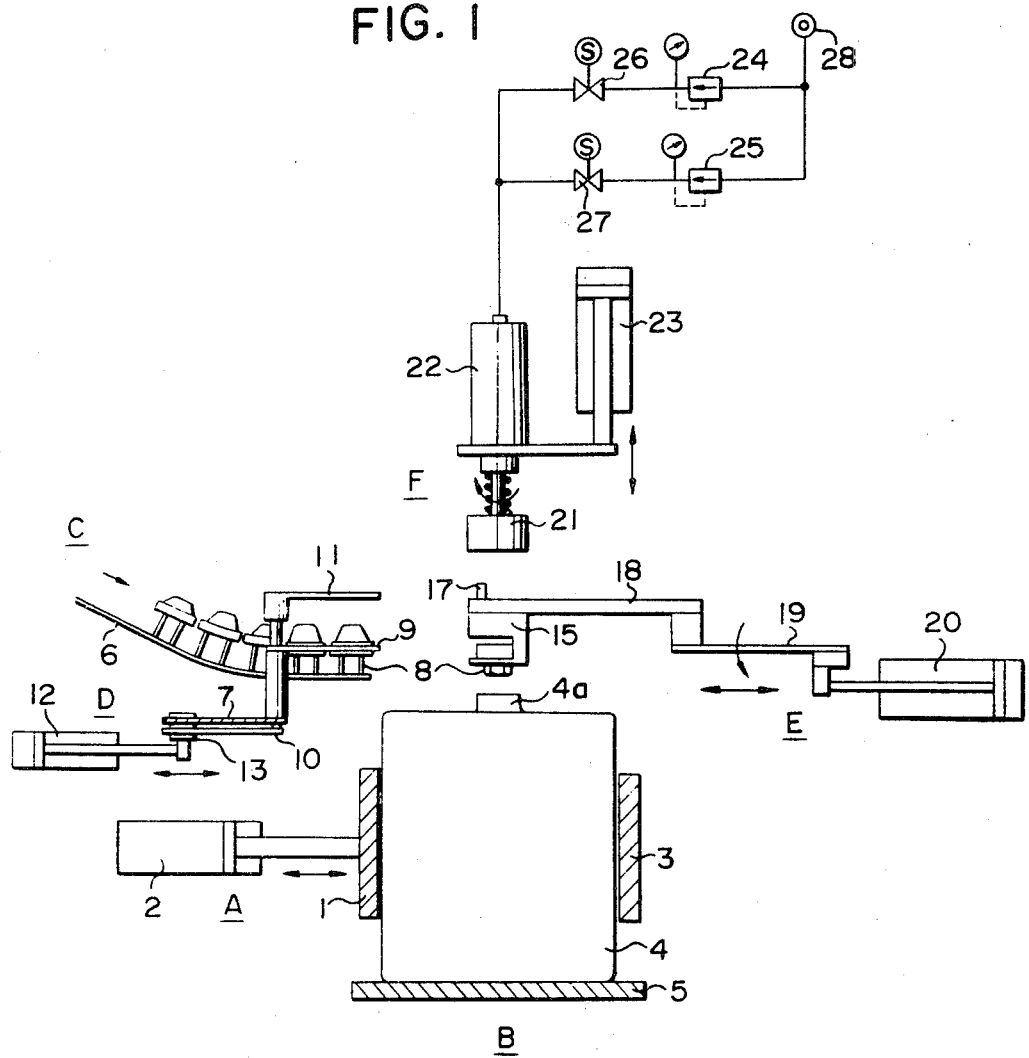
FIG. 1 is an explanatory view generally showing an apparatus for this invention.

In FIGS. 1 and 2, A is a battery fixing means consisting of a push plate 1, a location cylinder 2 connected with it and a stopper 3 so that a battery 4 may be fixed in a determined position.

B is a battery conveying means. As a part of it is illustrated a conveyor 5. In the same manner, 6 is a somewhat inclined chute provided as a part of a vent plug supplying means C at the forward end. On this chute 6 are arranged many vent plugs 8 adapted to be screwed into vents 4a on the battery 4.

D is a vent plug holding means consisting on a roller 13 connected with an advancing and retreating separating cylinder 12 so that stoppers 9 and 9′ for vent plugs 8 may be opened and closed by scissors-shaped stop levers 7 and that cams 11 and 11′ may be opened and closed by scissors-shaped cam levers 10 and tension springs 14 and 14′ provided respectively on the stop levers 7 and cam levers 10.

E is a vent plug catching means consisting of a catcher 15 provided with a pair of fingers 16 and a pair of pins 17, a pair of plate springs 18 connected with said catcher 15 and expansible in the horizontal direction and a pair of plate springs 19 connected at one end with said pair of plate springs 18 and at the other end with a catching cylinder 20, flexible in the vertical direction and made, for example, of a spring steel.

F is a vent plug screwing means formed of an air motor 22 having a rotary attachment 21 at the lower end, an air motor cylinder 23 elevating and lowering said air motor 22 and pressure reducing valves 24 and 25 and solenoid valves 26 and 27 respectively for low-torques and high-torques as parallely provided between the air motor 22 and a compressed air source 28.

The above described battery fixing means A, battery conveying means B, vent plug supplying means C, vent plug holding means D, vent plug catching means E and vent plug screwing means F are operated as related with one another and perfectly moved automatically by a control equipment (not illustrated) consisting of a combination of a timer, relay and limit switch.

FIG. 3 is a chart explaining a time lapse in which the above mentioned means operate. In the chart, the main elements of the respective means are shown on the left side and the operations of the respective main elements with the lapse of the time (in seconds) are shown on the right side. The up line shows an advance or rise, the down line shows a retreat or fall, the flat line shows a drive of the conveyor. Further, LS shows a limit switch. A plurality of limit switches are provided. $T_1$ shows a low rotation and $T_2$ shows a high rotation.

Now the operation of the apparatus of this invention shall be explained in the following with reference to FIG. 3.

First of all, when the apparatus of this invention is operated, the location cylinder 2 will advance and the battery 4 on the conveyer 5 will be fixed in the determined position by the push plate 1 connected with the location cylinder 2 and the stopper 3. On the other hand, the vent plugs 8 fed as arranged on the chute 6 from the vent plug supplying means C will remain stopped by the stoppers 9 and 9′ of the vent plug holding means D. In such case, when the location cylinder 2 comes to the advance limit, the limit switch $LS_1$ will be on, the catching cylinder 20 will begin to operate and the pair of fingers 16 of the catcher 15 will advance, will be expanded along the cams 11 and 11′ by the pair of pins 17 and will positively catch the vent plug 8 at the foremost end of the chute 6. When the catcher cylinder 20 comes at the limit of forward stroke, the limit switch $LS_2$ will be on, the separating cylinder 12 will operate to advance the roller 13, the stop levers 7 and cam levers 10 will open and, at the same time, the cams 11 and 11′ will close and the stoppers 9 and 9′ will open. When the separating cylinder 12 comes at the limit of forward stroke, the limit switch $LS_3$ will be on and the catching cylinder 20 will retreat. In such case, the pair of fingers 16 will retreat while catching the vent plug 8 and will bring it to the determined position on the battery 4. When the catching cylinder 20 comes at the limit of backward stroke, the limit switch $LS_4$ will be on. In case the limit switch $LS_4$ is on, the separating cylinder 12, air motor 22 and air motor cylinder 23 will simultaneously begin to operate. The separating cylinder 12 will operate to retreat the roller 13, the stop levers 7 and cam levers 10 will be closed by the tension springs 14 and 14′ and, at the same time, the cam levers 11 and 11′ will open and the stoppers 9 and 9′ will close. Air adjusted in advance to be under a low pressure by the pressure reducing valve 24 for low-torques will be fed from the compressed air source 28 to the air motor 22 by opening the solenoid valve 26 for low-torques so as to rotate the provided rotary attachment 21 at a low speed. The air motor cylinder 23 will operate to lower the rotary attachment 21 attached to the air motor 22 while rotating it. The rotary attachment 21 will mesh with the vent plug 8 caught with the pair of fingers 16 on the head, will push it in while rotating it and will continue to rotate it until the pair of flexible plate springs 19 flex to temporarily screw the vent plug 8 in the vent 4a of the battery 4.

When the catching cylinder 20 is then again operated to retreat the pair of fingers 16, the pair of plate springs 18 will open and the pair of fingers 16 will be released from the vent plug 8. When the above mentioned catching cylinder 20 comes at the limit of backward stroke, the limit switch $LS_5$ will be on, air under a high pressure adjusted in advance by the pressure reducing valve 25 for high-torques will be fed to the air motor 22 by opening the solenoid valve 27 for high-torques so as to screw the vent plug 8 while rotating the rotary attachment at a high speed. Thus the vent plug 8 will be fitted as positively screwed in the vent 4a of the battery 4.

Then the rotary attachment 21 having stopped the rotation will rise with the rise of the air motor cylinder 23 and, at the same time, the location cylinder 2 will retreat to retreat the battery push plate 1. When the location cylinder 2 comes at the limit of backward stroke, the limit switch $LS_6$ will be on and the battery conveying means will drive to move the conveyor 5. The battery 4 fitted with the vent plug 8 will be taken out of the apparatus by the conveyor 5. Thus the operation of automatically fitting the vent plug to the battery will be completed.

The above described apparatus of this invention has an advantage of quickly and automatically fitting many vent plugs to many batteries without requiring manual works at such high efficiency that the reduction of the cost of the product can be expected. Further, as the respective means operated as related with one another by the control equipment are of mechanisms independent of one another and the plate springs are used, in the apparatus of this invention, the structure is very simple as a whole and the vent plug can be positively held and screwed. Further, as the mechanism for switching air pressures in two steps is adopted in the screwing means, it is easy to release the fingers and adjust the screwing torque. The apparatus of this invention has such many advantages.

Though an embodiment of this invention has been shown it is obvious that various modifications are possible within a range not deviating from the spirit of the invention. For example, though there is shown an example of fitting one vent plug to a battery, this invention is not limited to it. It is needless to say that it is possible to set any number of the above described chutes, catchers and rotary attachments so that a plurality of vent plugs may be fitted simultaneously to one or a plurality of batteries.

What I claim is:

1. An apparatus for installing battery vent plug comprising a battery fixing means for fixing a battery, vent plug holding means for holding a vent plug supplied from a vent plug supplying means, vent plug catching means for catching the vent plug and bringing it to a vent of the battery, a vent plug screwing means for fitting the vent plug to the vent of the battery and a battery conveying means for conveying the battery fitted with the vent plug as operatively connected with one another.

2. An apparatus for installing battery vent plug according to claim 1 wherein said vent plug holding means is so made that, when a roller connected with a separating cylinder advances, stop levers and cam levers may open and, at the same time, stoppers may open and cams may close and, when the above mentioned roller retreats and due to tension springs provided on the stop levers and cam levers, the stop levers and cam levers may close and, at the same time, the stoppers may close and the cams may open.

3. An apparatus for installing battery vent plug according to claim 1 wherein said vent catching means consists of a catcher provided with a pair of fingers and pair of pins, a pair of plate springs expansible in the horizontal direction, a pair of plate springs flexible in the vertical direction and a catching cylinder as connected with one another.

4. An apparatus for installing battery vent plug according to claim 1 wherein said vent plug screwing means consists of an air motor cylinder and pressure reducing valves and solenoid valves respectively for low-torques and high-torques provided in parallel between an air motor provided with a rotatable rotary attachment and a compressed air source.

* * * * *